US006924871B2

(12) United States Patent
Washizawa et al.

(10) Patent No.: US 6,924,871 B2
(45) Date of Patent: Aug. 2, 2005

(54) LIQUID CRYSTAL DEVICE, METHOD FOR FABRICATING LIQUID CRYSTAL DEVICE, AND ELECTRONIC APPARATUS

(75) Inventors: Takehito Washizawa, Suwa (JP); Yoichi Momose, Matsumoto (JP); Masahiro Kosuge, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 10/663,812

(22) Filed: Sep. 17, 2003

(65) Prior Publication Data

US 2004/0114090 A1 Jun. 17, 2004

(30) Foreign Application Priority Data

Oct. 25, 2002 (JP) ..................................... 2002-311108

(51) Int. Cl.$^7$ ................................................ G02F 1/13
(52) U.S. Cl. .................................................... 349/156
(58) Field of Search ................................. 349/158, 155, 349/156

(56) References Cited

U.S. PATENT DOCUMENTS

| | | | | |
|---|---|---|---|---|
| 6,154,267 A | * | 11/2000 | Kondo et al. ............... | 349/156 |
| 6,281,960 B1 | * | 8/2001 | Kishimoto et al. ......... | 349/156 |
| 6,339,462 B1 | * | 1/2002 | Kishimoto et al. ......... | 349/156 |
| 6,373,547 B2 | * | 4/2002 | Saito et al. ................. | 349/155 |
| 6,424,402 B1 | * | 7/2002 | Kishimoto .................. | 349/156 |
| 6,433,852 B1 | * | 8/2002 | Sonoda et al. .............. | 349/156 |
| 6,535,188 B1 | * | 3/2003 | Morimoto .................... | 345/87 |
| 6,674,503 B2 | * | 1/2004 | Niiya et al. ................. | 349/155 |
| 6,721,024 B1 | * | 4/2004 | Kishimoto et al. ......... | 349/123 |
| 6,724,458 B2 | * | 4/2004 | Kim et al. ................... | 349/156 |
| 6,774,975 B2 | * | 8/2004 | Ahn ............................ | 349/156 |
| 6,788,380 B2 | * | 9/2004 | Melnik et al. .............. | 349/156 |

FOREIGN PATENT DOCUMENTS

| | | |
|---|---|---|
| JP | A 7-191332 | 7/1995 |
| JP | A 2001-222015 | 8/2001 |

\* cited by examiner

*Primary Examiner*—James A. Dudek
(74) *Attorney, Agent, or Firm*—Oliff & Berridge, PLC

(57) ABSTRACT

The invention provides a liquid crystal device that is substantially free from problems, such as deterioration in display contrast by preventing or inhibiting the nonuniformity of the gap between substrates. Since a liquid crystal display device has a structure in which spacers are disposed between a pair of substrates having a liquid crystal layer sandwiched and held therebetween; depressions are formed on the substrate; and the spacers are disposed mainly in the depressions, the gap between the substrates is reliably made more uniform across the surfaces of the substrates. Especially, since the depressions are formed so as to correspond to non-pixel regions, the spacers have less influence on display.

9 Claims, 8 Drawing Sheets

FIG. 9a  UNCOLORED SPACERS
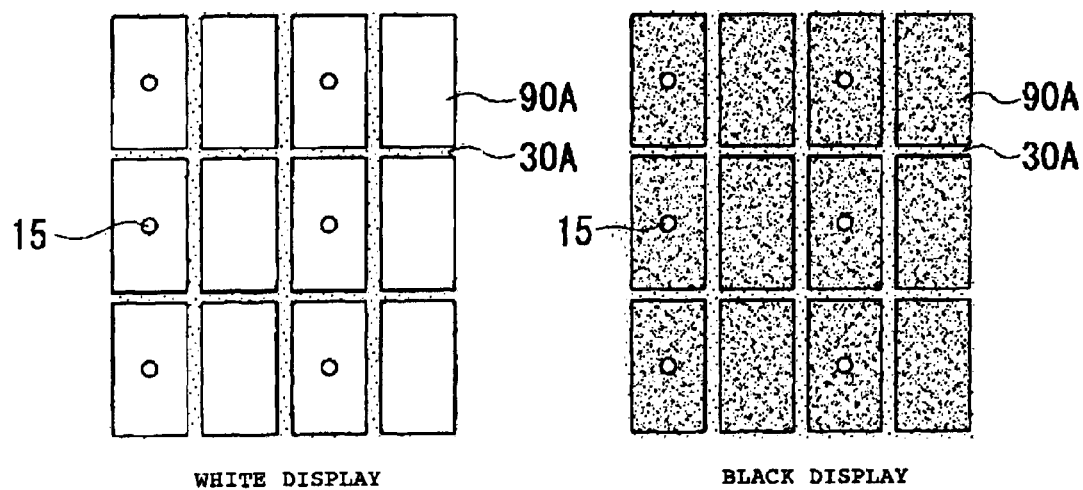
WHITE DISPLAY                BLACK DISPLAY
FIG. 9b  COLORED SPACERS
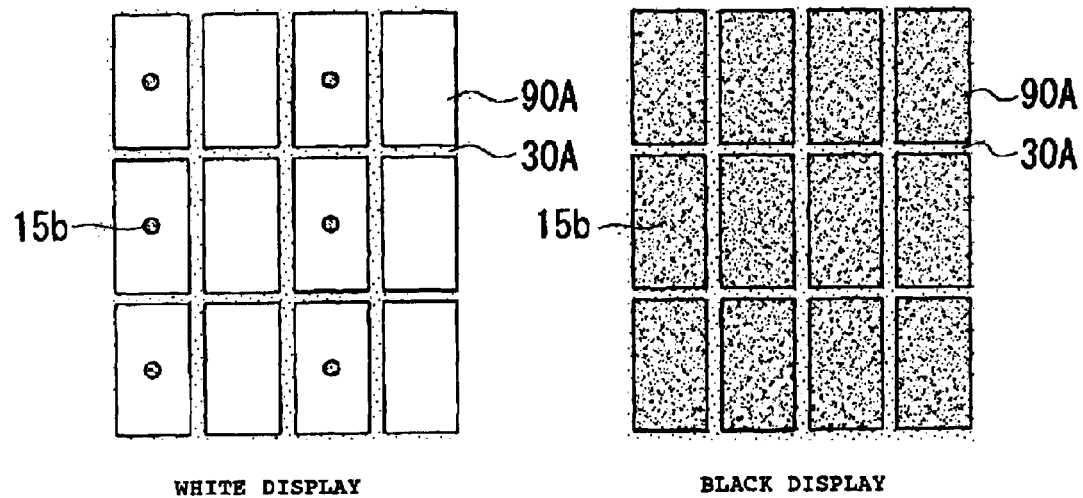
WHITE DISPLAY                BLACK DISPLAY

LIQUID CRYSTAL DEVICE, METHOD FOR FABRICATING LIQUID CRYSTAL DEVICE, AND ELECTRONIC APPARATUS

BACKGROUND OF THE INVENTION

1. Field of Invention

The present invention relates to a liquid crystal device, a method for fabricating the liquid crystal device, and an electronic apparatus including the liquid crystal device. More specifically, the invention relates to a technique of disposing spacers between substrates.

2. Description of Related Art

A related art liquid crystal device has a structure in which a lower substrate and an upper substrate are bonded together along the respective peripheries thereof, having a sealing member interposed therebetween at a predetermined gap, and a liquid crystal layer is hermetically filled between the pair of substrates. Also, a related art liquid crystal device has an exemplary structure in which a lower substrate has a color filter layer, which includes red, green and blue coloring layers, and a light-shielding layer (a black matrix), and a protective layer to protect the color filter layer, sequentially formed thereon, and in addition, the lower substrate has transparent electrodes formed in a striped array on the protective layer. An upper substrate has other transparent electrodes formed thereon in a striped array, and both transparent electrodes have respective alignment films formed thereon.

In such a liquid crystal device, a large number of spherical spacers are disposed between the substrates, each substrate having the corresponding transparent electrodes and alignment films formed thereon, in order to make the gap between the substrates uniform across the surfaces of the substrates. One of two related art methods of disposing such spacers between the substrates is a wet scattering method with which a spacer-dispersed solution prepared by dispersing the spacers in a solvent such as water, chlorofluorocarbon, isopropyl alcohol, or ethanol is sprayed with gas such as air or nitrogen so as to be scattered on the surface of either of the substrates; and the other is a dry scattering method with which the spacers get electrically charged spontaneously or by some artificial method while being supplied with a carrier gas such as air or nitrogen and are accreted on either of the substrates due to the electrostatic forces thereof. In such wet and dry scattering methods, since the spacers are scattered on either of the substrates due to the free fall thereof, it is difficult to control the scatter positions of the spacers; as a result, sometimes the following problems take place.

For example, when spacers are partly aggregated in some locations in a liquid crystal device, and thus the distribution density of the spacers becomes nonuniform, the variance of gaps between the substrates sometimes becomes larger. Also, in the case of a liquid crystal device of an active-matrix type, since switching elements and the like for driving the transparent electrodes are formed on the substrates, steps are produced on the surfaces corresponding to the regions where elements have been formed. When the spacers are scattered on such regions having the steps formed therein, the variance of gaps between the substrates sometimes becomes larger.

When the variance of gaps between the substrates becomes larger as described above, the variance of thickness of a liquid crystal layer (the cell thickness) sandwiched therebetween becomes larger. Thus, when the liquid crystal device is used as a display device, the large variance of cell thicknesses causes display performance of the display device to be deteriorated.

In particular, in the liquid crystal display in an STN (super twisted nematic) mode, the transmittance of light varies as the value of $\Delta n \cdot d$ varies (where, $\Delta n$: double refractive index of liquid crystal, d: cell thickness). Accordingly, large variations in values of $\Delta n \cdot d$, that is, large variance of the cell thickness d causes large variations in light transmittances and thus color unevenness of display to occur, whereby the quality of display sometimes deteriorates. In order to reduce the forgoing variance of cell thicknesses, for example, Japanese Patent Laid-Open No. 2001-222015 discloses a technique with which, corresponding to projections formed on the substrate, depressions are formed on a counter substrate.

SUMMARY OF THE INVENTION

However, in this case, since the partial aggregation of the spacers cannot be avoided, the variance of the cell thickness is not always reduced. The present invention addresses the above and/or other problems, and provides a liquid crystal device that is substantially free from problems, such as deterioration in display quality by preventing or reducing nonuniformity of the gap between substrates; a method for fabricating the liquid crystal device; and an electronic apparatus including the liquid crystal device.

In order to address or solve the above, a liquid crystal device according to the present invention includes spacers disposed between a pair of substrates sandwiching and holding a liquid crystal layer. At least one of the pair of substrates has depressions formed thereon, and the spacers are mainly disposed in the depressions.

Since such a liquid crystal device has a structure in which the depressions are formed on the substrate, and the spacers are mainly disposed in the depressions, the gaps between the substrates can be made more uniform, and in the relationship between the depth of the depressions and the diameter of the spacers, the gap between the substrates can be freely designed. Also, the spacers can be prevented or inhibited from flowing into other regions than the depression, and as a result, the spacers can be prevented or inhibited from suspending in the liquid crystal layer. Meanwhile, disposition of the spacers only in the depressions is actually more preferable. In practice, the spacers are disposed in the depressions to an extent as possible as in fabrication, and in order to achieve advantages of the present invention, for example, ninety percent or more of the spacers to be disposed are preferably disposed in the depressions.

The liquid crystal device according to the present invention may have a structure in which the substrate has pixel regions and non-pixel regions on the surface thereof, and the depressions are formed in the non-pixel regions. In this case, since the spacers are disposed mainly in the non-pixel regions, negative influence of the spacers on display, for example, defective display due to disturbed alignment of liquid crystal molecules lying around the spacers can be prevented or inhibited. Also, in the liquid crystal device including the pixel regions and the non-pixel regions, the spacers are preferably disposed in the non-pixel regions, taking the negative influence on display into account. Whereas, there is a trend that each non-pixel region becomes narrower since each pixel region is made larger so as to increase the area of pixel which contributes to display. Generally, it is often difficult to dispose the spacers in such non-pixel regions becoming narrower. However, according to the present invention, when the depressions are formed in the non-pixel regions and the spacers are disposed in the depressions, since the spacers are easily introduced into the depressions, the spacers can be more easily disposed in the non-pixel regions. Accordingly, the spacers can be more reliably disposed even in the non-pixel regions which are becoming narrower, thereby achieving a liquid crystal device which exhibits excellent display characteristics.

Also, the liquid crystal device may have a structure in which a plurality of coloring layers are formed so as to correspond to the pixel regions; light-shielding films that are thinner than the coloring layers are formed between the adjacent coloring layers so as to correspond to the non-pixel regions; and the depressions are formed on the corresponding light-shielding films. In a color filter layer including the above-mentioned coloring layers and light-shielding films, by making the light-shielding films formed so as to correspond to the non-pixel regions thinner than the coloring layers, the above-mentioned depressions can be disposed on the light-shielding films; accordingly, when the spacers are disposed in the depressions according to the above description, the advantages of the present invention can be achieved.

Also, the liquid crystal device may have a structure in which a plurality of scanning electrodes are formed on one of the pair of substrates; a plurality of data electrodes are formed on the other substrate so as to intersect with the scanning electrodes; and the depressions are formed between the adjacent scanning electrodes and between the adjacent data electrodes. In the liquid crystal device of a passive-matrix type, including the above-mentioned scanning electrodes and data electrodes, since the depressions are formed between the adjacent electrodes, for example, formed in a stripe array, when the spacers are disposed in the depressions according to the above description, the advantages of the present invention can be achieved. In place of the above structure, the depressions can be directly formed in the substrate.

Meanwhile, each spacer may be provided with an alignment-regulating device on a part of the surface or the whole surface thereof. That is, although disturbed alignment of liquid crystal molecules lying in the vicinity of the surface of the spacer sometimes cause deterioration in display contrast, by providing the spacer with the above-mentioned alignment-regulating device on the surface thereof, the liquid crystal molecules can be properly aligned even in the vicinity of the surface of the spacer, thereby achieving a liquid crystal device that is substantially free from problems, such as deterioration in display contrast. An exemplary alignment-regulating device includes each spacer being provided with long-chain alkyl groups on the surface thereof by using, for example, a silane coupling agent.

Also, each spacer may have a structure in which a cured thermosetting resin accretes on the partial or the whole surface thereof. By accreting the thermosetting resin on the surfaces of the spacers as mentioned above and by treating the resin with heat, for example, after disposing the spacers in the depressions, the spacers can be stably fixed to the bottom surfaces of the depressions, thereby more reliably reducing or preventing such a problem that some spacers move out of the corresponding depressions and become suspended in the liquid crystal.

In addition, the spacers may be treated with coloring. For example, when the liquid crystal device is used as a display device, in regions where black display (i.e., dark display) is performed, light leaks from portions of the regions where the spacers are disposed, thereby sometimes white display (i.e., bright display) is falsely performed in the portions. However, by treating the spacers with coloring as mentioned above, especially by using the spacers colored in black, the black display (i.e., dark display) can be reliably performed.

Next, a method for fabricating the foregoing liquid crystal device includes the following steps. A method for fabricating a liquid crystal device that includes spacers disposed between a pair of substrates sandwiching and holding a liquid crystal layer, includes forming depressions on at least one of the substrates; and disposing the spacers in the depressions. In the step of disposing the spacers, when a spacer-dispersed solution prepared by dispersing the spacers in a predetermined solvent is discharged in the depressions on the substrate with a droplet-discharging method, and when the solvent is evaporated, the spacers are disposed in the depressions.

As mentioned above, by scattering the spacers with the droplet-discharging method using a droplet-discharging nozzle by which discharge positions and the discharge number of droplets to be discharged can be arbitrarily set, the positions and the numbers of spacers to be scattered on the substrate can be easily controlled. Thus, in accordance with the fabrication method according to the present invention including the droplet-discharging method, droplets can be reliably dropped in the depressions on the substrate. According to the present invention, since the droplets are dropped in the depressions, even when the droplets flow over the corresponding depressions, the spacers are likely to move, in the course of evaporating the solvent, to the central parts of dropped points of the droplets, that is, the central parts of the depressions, due to the surface tension of the solvent, whereby the spacers are more reliably disposed around the central parts of the corresponding depressions. As a result, the spacers can be disposed only in the depressions formed on the substrate. An example of the droplet-discharging method is an inkjet-discharging method using an ink-jet nozzle.

The method for fabricating the liquid crystal device according to the present invention may be configured such that, in the step of forming the depressions, when electrodes having a predetermined pattern are formed on the substrate, the depressions are formed between the adjacent electrodes.

Alternatively, the method may be configured such that, in the step of forming the depressions, when a plurality of light-shielding films are formed on the substrate and when coloring layers thicker than the light-shielding films are formed between the adjacent light shielding films, the depressions can be formed on the light-shielding films. In place of the above method, the depressions may be directly formed in the substrate.

Also, an electronic apparatus according to the present invention includes the above-described liquid crystal device, for example, as a display device. An electronic apparatus having excellent display quality can be provided by including the liquid crystal device according to the present invention as mentioned above.

BRIEF DESCRIPTION OF THE DRAWINGS

FIGS. 9a and 9b are schematics that illustrate the effect of the spacer shown in FIG. 7;

DETAILED DESCRIPTION OF PREFERRED EMBODIMENTS

Exemplary embodiments of the present invention are described below with reference to the accompanying drawings.

[Exemplary Liquid Crystal Device]

(Exemplary Embodiment 1)

Figure 1:
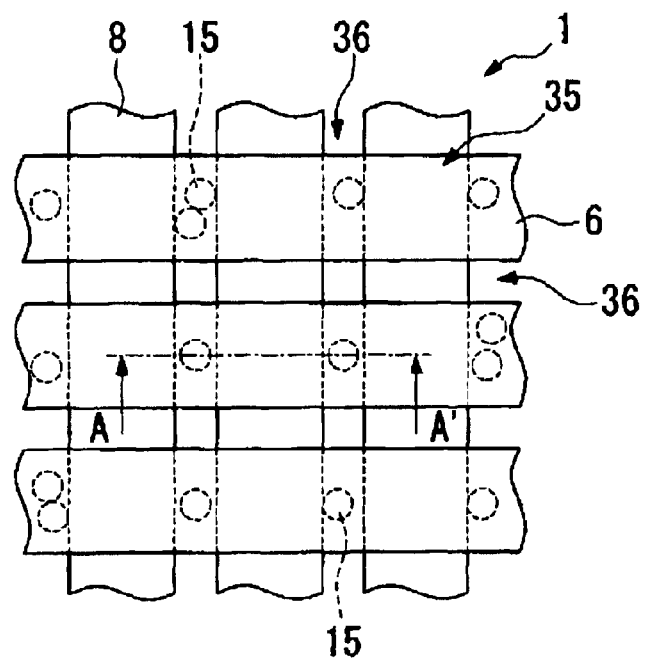
FIG. 1 is a schematic plan view illustrating the positional relationship between electrodes and spacers of the liquid crystal display device according to Exemplary Embodiment 1 of the present invention.
Figure 2:
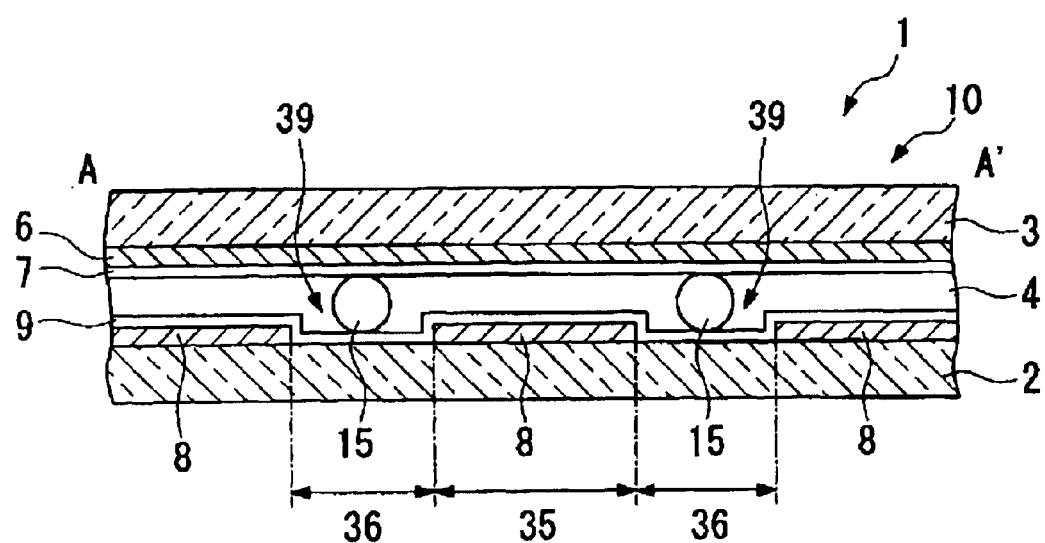
FIG. 2 is a schematic sectional view illustrating the liquid crystal display device shown in FIG. 1, taken along Plane A–A' indicated in FIG. 1.

FIG. 1 is a schematic plan view in part illustrating a liquid crystal display device serving as Exemplary Embodiment 1 of the liquid crystal device according to the present invention. FIG. 2 is a schematic sectional view taken along Plane A–A' indicated in FIG. 1, illustrating an example of the liquid crystal display device of a passive matrix type according to the present exemplary embodiment. In the drawings shown below, ratios of thicknesses and dimensions, and the like, of components are changed when needed to facilitate easy viewing of the drawings.

As shown in FIG. 2, a liquid crystal display device 1 is generally formed by a liquid crystal panel 10 having a general structure in which a lower substrate 2 and an upper substrate 3 are disposed so as to face each other and a liquid crystal 4 composed of STN (super twisted nematic) liquid crystal is sandwiched and held in the space formed between the lower and upper substrates 2 and 3, and by a backlight (not shown) disposed close to the rear surface of the liquid crystal panel 10 (close to the outer surface of the lower substrate 2).

On the inner surface of the lower substrate 2 composed of glass, resin, or the like, scanning electrodes 8 formed in a striped array, made of a transparent conductive film composed of ITO or the like, extend in a direction perpendicular to the plane of the figure, and an alignment film 9 composed of polyimide or the like is deposited so as to cover the scanning electrodes 8. Meanwhile, on the inner surface of the upper substrate 3 composed of glass, resin or the like, signal electrodes (data electrodes) 6 formed in a striped array, made of a transparent conductive film composed of ITO or the like, extend in the lateral direction in the figure so as to be orthogonal to the scanning electrodes 8 on the lower substrate 2, and an alignment film 7 composed of polyimide or the like is deposited on the signal electrodes 6.

As shown in FIGS. 1 and 2, regions where the scanning electrodes 8 and the signal electrodes 6 intersect each other are defined as pixel regions 35 where display is performed by driving liquid crystal in accordance with changes in electric potentials between the mutually corresponding electrodes, and the remaining regions where the electrodes 8 and 6 do not intersect each other are defined as non-pixel regions 36. The non-pixel regions 36 are formed in the clearances between the adjacent scanning electrodes 8 formed in a striped array and between the adjacent signal electrodes 6 formed in a striped array, and at least depressions 39 are formed in the non-pixel regions 36 serving as non-formation regions of the electrodes 8 and 6.

Meanwhile, the lower substrate 2 having the scanning electrodes 8 and the alignment film 9 formed thereon and the upper substrate 3 having the signal electrodes 6 and the alignment film 7 formed thereon have the liquid crystal (the liquid crystal layer) 4 sandwiched and held therebetween, having spacers 15 interposed therebetween, and especially in the present exemplary embodiment, the spacers 15 are disposed only or mainly in the depressions 39. As a result, in the liquid crystal display device 1 according to the present exemplary embodiment, since the spacers 15 are disposed only or mainly on the bottom surfaces of the depressions 39 formed in the non-pixel regions 36, the gap between the substrates (the cell gap) is made more uniform across the surfaces of the substrates than in the case where the spacers would be scattered on spaces having different heights on the substrate. Also, if needed, by setting the diameter of the spacers 15 in accordance with the depth of the depressions 39, a desired gap between the substrates (a desired cell gap) can be obtained, thereby providing more design freedoms of the gap between the substrates.

Alternatively, in order to obtain a desired depth of the depressions 39 or to make the depth of the depressions 39 greater, holes may be directly formed in the lower substrate 2 such that the spacers 15 are disposed so as to correspond to the holes. Also, in the present exemplary embodiment, although the depressions 39 are formed in the non-pixel regions 36 by way of example, the spacers can be disposed in any depressions formed on the substrate from the view point of uniformity of the gap between the substrates; accordingly, formation of the depressions in the non-pixel regions is not always required.

(Exemplary Embodiment 2)

Figure 3:
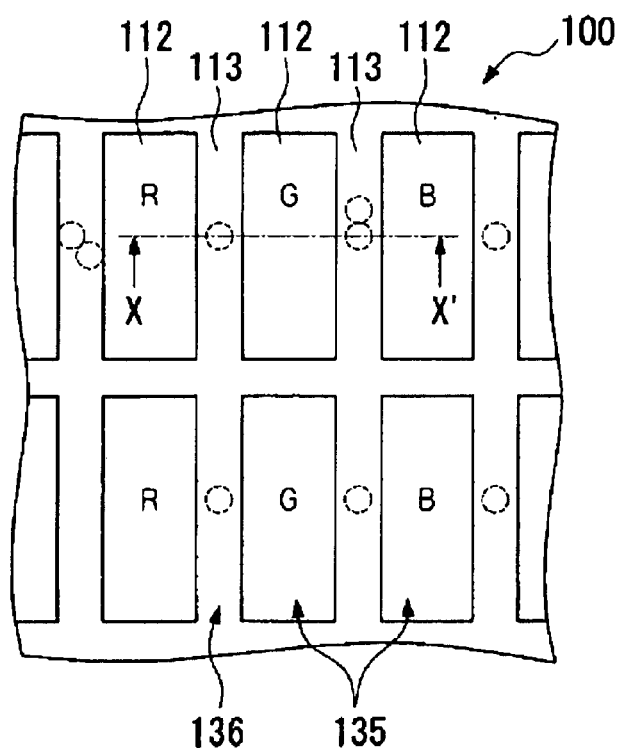
FIG. 3 is a schematic plan view illustrating the positional relationship between electrodes and spacers of a liquid crystal display device according to Exemplary Embodiment 2 of the present invention.
Figure 4:
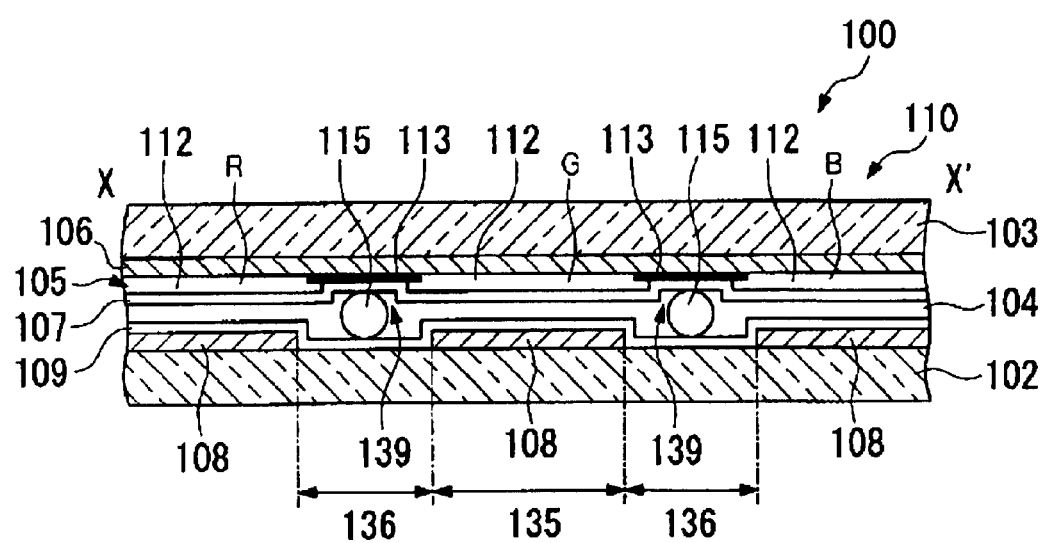
FIG. 4 is a schematic sectional view illustrating the liquid crystal display device shown in FIG. 3, taken along Plane X–X' indicated in FIG. 3.

FIG. 3 is a schematic plan view in part of a liquid crystal display device serving as Exemplary Embodiment 2 of the liquid crystal device according to the present invention. FIG. 4 is a schematic sectional view taken along Plane X–X' indicated in FIG. 3, illustrating an example of the liquid crystal display device of an active matrix type according to the present exemplary embodiment. In the drawings shown below, ratios of thicknesses and dimensions, and the like, of components are changed when needed to facilitate easy viewing of the drawings.

As shown in FIG. 4, a liquid crystal display device 100 is generally formed by a liquid crystal panel 110 having a general structure in which a lower substrate 102 and an upper substrate 103 are disposed so as to face each other, and liquid crystal 104 is sandwiched and held in the space between the lower and upper substrates 102 and 103, and by a backlight (not shown) disposed close to the rear surface of the liquid crystal panel 110 (close to the outer surface of the lower substrate 102). In the liquid crystal display device 100 according to the present embodiment, TFT (thin film transistor) elements used as switching elements are formed in non-pixel regions 136 of the lower substrate 102. Accordingly, in the present exemplary embodiment, the lower substrate 102 serves as an element substrate and the upper substrate 103 serves as a counter substrate.

On the inner surface of the lower substrate 102 composed of glass, resin or the like, pixel electrodes 108 made of a transparent conductive film composed of ITO or the like are formed in a matrix array, and an alignment film 109 composed of polyimide or the like is formed so as to cover the pixel electrodes 108. On the inner surface of the upper substrate 103 composed of glass, resin, or the like, planar counter electrodes 106 made of a transparent film composed of ITO or the like, a color filter layer 105 including coloring layers 112 and light-shielding films 113 both formed on the counter electrodes 106, and an alignment film 107 composed of polyimide or the like formed on the color filter layer 105 are deposited.

As shown in FIGS. 3 and 4, the pixel electrodes 108 and the coloring layers 112 are formed in the same regions in plan view so as to perform color display by driving liquid crystal in accordance with changes in electric potentials between the pixel electrodes 108 and the corresponding counter electrodes 106. As mentioned above, the regions where the pixel electrodes 108 and the coloring layers 112 are formed are defined as pixel regions 135, and the remaining regions where no pixel electrodes 108 are formed but the light-shielding films 113 are formed, are defined as the non-pixel regions 136. In the present exemplary embodiment, since the light-shielding films 113 are formed so as to be thinner than the coloring layers 112, depressions 139 are formed in the regions where the light-shielding films 113 are formed, that is, in the non-pixel regions 136 and on the upper substrate 103.

The lower substrate 102 having the pixel electrodes 108 and the alignment film 109 formed thereon and the upper substrate 103 having the counter electrodes 106, the color filter layer 105, and the alignment film 107 formed thereon have the liquid crystal (the liquid crystal layer) 104 sandwiched and held therebetween, having spacers 115 interposed therebetween. In the present exemplary embodiment, the spacers 115 are especially disposed only or mainly in the depressions 139. Accordingly, in the liquid crystal display device 100 according to the present exemplary embodiment, since the spacers 115 are disposed only or mainly on the bottom surfaces of the depressions 139 formed on the light-shielding films 113 in the non-pixel regions 136, the gap between the substrates (the cell gap) is made more uniform across the surfaces of the substrates than in the case where spacers would be scattered in spaces having different heights on the substrate. Also, if needed, by setting the diameter of the spacers 115 in accordance with the depth of the depressions 139, a desired gap between the substrates (a desired cell gap) can be obtained, thereby providing more design freedoms of the gap between the substrates. Alternatively, in order to obtain a desired depth of the depressions 139 or to make the depth of the depressions 139 greater, holes may be directly formed in the upper substrate 103 such that the spacers 115 are disposed so as to correspond to the holes.

The structures of the spacers 15 (115) used in the liquid crystal display devices according to the exemplary embodiments described in the above are explained below. The spacers 15 and 115 are made of spherical members composed of, for example, silica dioxide or polystyrene, and the diameters thereof are respectively set in concert with the thicknesses of the liquid crystal (the liquid crystal layers) 4 and 104 (the cell thicknesses) hermetically sealed in the liquid crystal device, especially in concert with the depths of the depressions 39 and 139 and, for example, are determined in the range from 2 to 10 micrometer.

Figure 5:
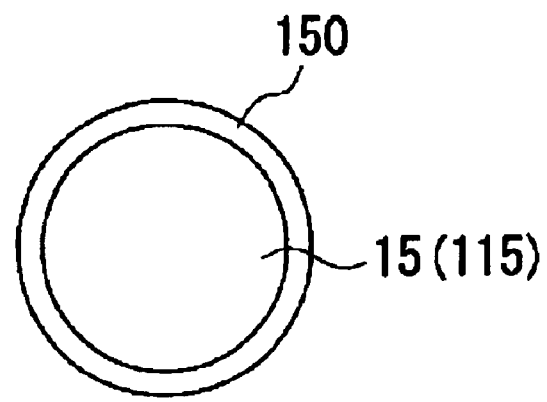
FIG. 5 is a schematic of the structure of the spacers.

Each of the spacers 15 (115) may have a structure having thermosetting resin provided on the surface thereof, as shown in FIG. 5. In this case, the curing of the thermosetting resin causes the spacers 15 (115) to be firmly fixed in a reliable manner to the lower substrate (i.e., a TFT array substrate) 2 and 102 and/or the upper substrate (i.e., a counter substrate) 3 and 103. For example, when the spacers 15 (115) are treated with heat so as to cure the thermosetting resin after being disposed on the lower substrate (i.e., a TFT array substrate) 2 and 102, the spacers 15 (115) are firmly fixed to the lower substrate (i.e., a TFT array substrate) 2 and 102.

Figure 6:
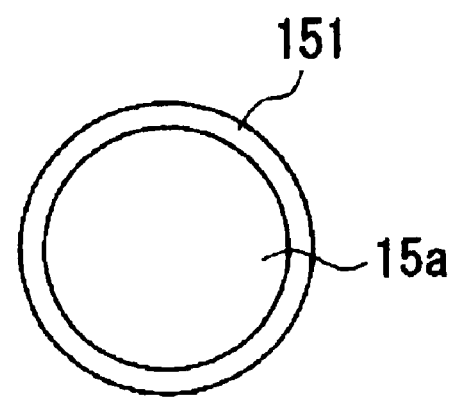
FIG. 6 is a schematic illustrating the structure of a spacer having a surface-treated layer formed thereon.
Figure 8A:
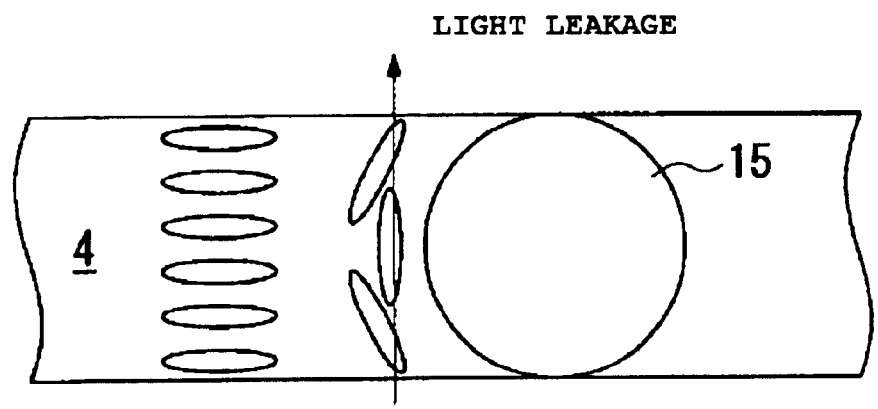
FIGS. 8a and 8b are schematics that illustrate the effect of the spacer shown in FIG. 6.
Figure 8B:
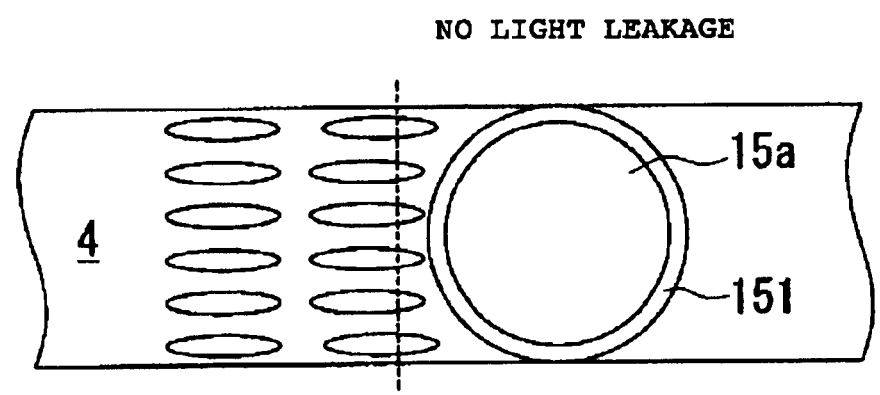

Also, each spacer may have a surface-treated layer 151, having long-chain alkyl groups, formed on the surface thereof, for example, as shown in FIG. 6. Methods of forming the surface-treated layer 151 having long-chain alkyl groups include, for example, a surface treatment with a silane coupling agent. When the spacer 15 has no surface-treated layer 151 formed thereon, and especially when the depression 39 is formed in the corresponding pixel region, alignment of liquid crystal molecules is disturbed in the vicinity of the surface of the spacer 15 as shown in FIG. 8a. As a result, light sometimes leaks from the foregoing vicinity. On the other hand, when a spacer 15a having the surface-treated layer 151 is used as shown in FIG. 8b, the liquid crystal molecules can be aligned in a predetermined direction (a vertical alignment in the present exemplary embodiment) in the vicinity of the surface of the spacer 15a, thereby reducing or preventing leakage of light from the foregoing vicinity.

Figure 7:
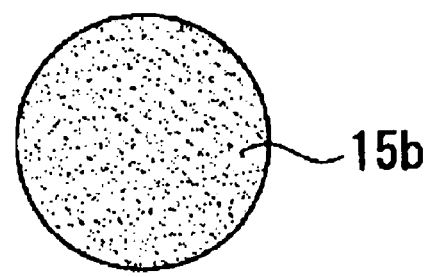
FIG. 7 is a schematic illustrating the structure of a spacer treated with coloring.

In addition, each spacer can be treated with coloring as shown in FIG. 7 illustrating a black-colored spacer 15b by way of example. For example, when the uncolored spacers 15 are used as shown in FIG. 9a, especially when the depressions 39 are formed in the pixel regions, white points corresponding to the spacers are displayed during black display (i.e., dark display), thereby sometimes causing a problem of deterioration in display contrast. Meanwhile, when the colored spacers 15b shown in FIG. 7 are used as shown in FIG. 9b, white points corresponding to the spacers are not displayed during black display (i.e., dark display). Although black points corresponding to the spacers are displayed during white display (i.e., bright display), the black points have less influence on deterioration in display contrast than the white points during black display (i.e., dark display).

[Exemplary Method for Fabricating Liquid Crystal Device]

A method for fabricating the liquid crystal devices according to the foregoing exemplary embodiments are described below, taking the liquid crystal display device 1 shown in FIGS. 1 and 2, for example. The scanning electrodes 8 are first formed in a striped array, for example, by photolithography, on the lower substrate 2 composed of glass or the like, and then the alignment film 9 composed of polyimide treated with rubbing is formed so as to cover the scanning electrodes 8. When the scanning electrodes 8 and the alignment film 9 are formed, the depressions 39 are formed between the adjacent scanning electrodes 8 formed in a striped array. When groove-shaped depressions are beforehand formed in the substrate 2 so as to correspond to the non-formation regions where no scanning electrodes 8 are formed, the depth of the depressions can be freely designed to a certain extent.

After the scanning electrodes 8 and the alignment film 9 are formed as described above, the spacers 15 are disposed in the depressions 39 on the substrate 2. More specifically, in the present exemplary embodiment, by discharging a spacer-dispersed solution, which is prepared by evenly dispersing the spacers 15 at a predetermined concentration with an ultrasonic method or the like into a single solvent or a combination of two or more solvents selected from water, chlorofluorocarbon, isopropyl alcohol, ethanol, and so forth, into the depressions 39 on the substrate 2, and then by drying the solution, the spacers 15 are disposed at fixed points in the depressions 39. In this case, an inkjet-discharging method is used to discharge the spacer-dispersed solution into the depressions 39.

Figure 10:
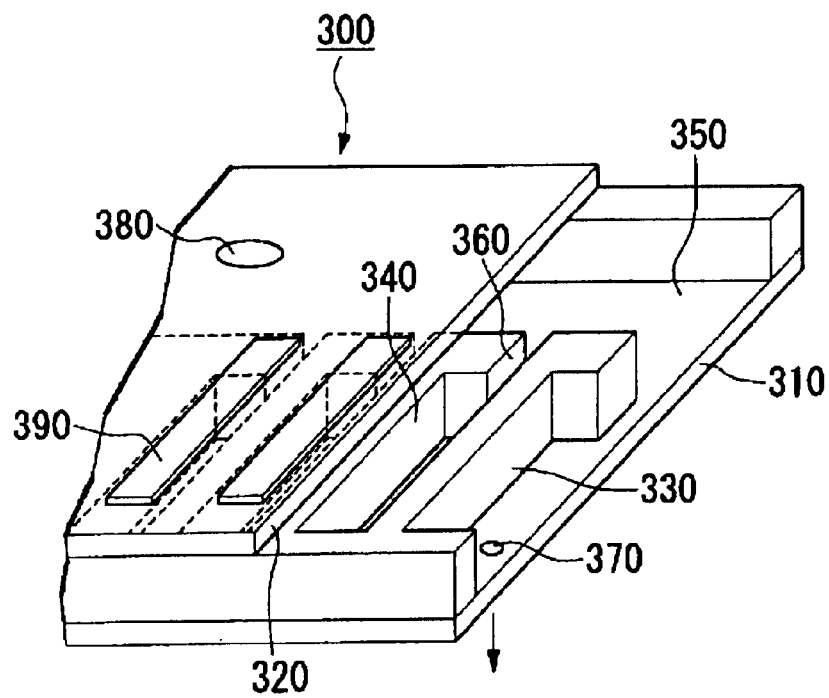
FIG. 10 is a schematic perspective view illustrating an example of an ink-jet nozzle used in the step of disposing the spacers in fabrication of the liquid crystal display device according to either of Exemplary Embodiment 1 and Exemplary Embodiment 2.
Figure 11:
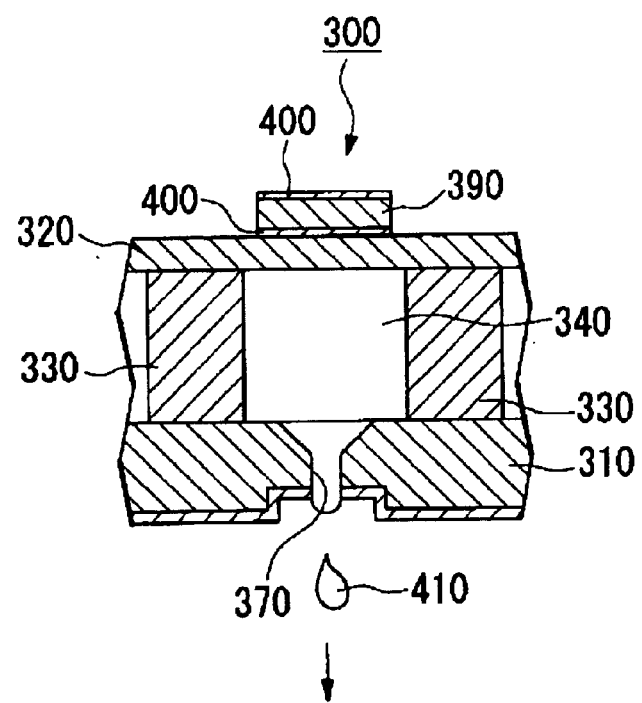
FIG. 11 is a schematic sectional view of the inkjet nozzle shown in FIG. 10.

The fixed point disposition of the spacers 15 by using the inkjet-discharging method is described below. In the present exemplary embodiment, when an inkjet nozzle 300 as shown in FIGS. 10 and 11 is used, since discharge positions and the discharge number of droplets of the spacer-dispersed solution can be arbitrarily set, a predetermined amount of the spacer-dispersed solution can be discharged at predetermined positions (in the depressions 39) on the substrate 2. After the discharge of the spacer-dispersed solution, by evaporating the solvent in the spacer-dispersed solution over time or with heat, a predetermined number of the spacers 15 can be disposed at fixed points in the depressions 39 on the substrate 2.

FIGS. 10 and 11 are respectively a perspective view and a sectional view of the inkjet nozzle 300. As shown in FIG. 10, the inkjet nozzle 300 includes a nozzle plate 310 and a diaphragm 320, composed of, for example, stainless steel, which are bonded together, having a partition member (i.e., a reservoir plate) 330 interposed therebetween. The nozzle plate 310 and the diaphragm 320 have a plurality of spaces 340 and a liquid reservoir 350 therebetween formed by the partition member 330. All the spaces 340 and the liquid reservoir 350 are filled with the above-mentioned spacer-dispersed solution, and each space 340 and the liquid reservoir 350 are communicated with each other through a feed opening 360. Also, the nozzle plate 310 has a nozzle hole 370 formed therein for spraying the spacer-dispersed solution from each of the spaces 340. Meanwhile, the diaphragm 320 has a hole 380 formed therein to feed the spacer-dispersed solution into the liquid reservoir 350.

Also, as shown in FIG. 11, the diaphragm 320 has a piezoelectric element 390 bonded on the surface thereof opposite to that facing each of the spaces 340. Since the piezoelectric element 390 is placed between a pair of electrodes 400, when the piezoelectric element 390 is activated, the piezoelectric element 390 bends in an outwardly protruding manner, and at the same time, the diaphragm 320 to which the piezoelectric element 390 is bonded also bends outwards integrally with the piezoelectric element 390. With this arrangement, the volume of the space 340 increases. Accordingly, an amount of the spacer-dispersed solution corresponding to the above increased volume flows into the space 340 from the liquid reservoir 350 through the feed opening 360. Then, when the piezoelectric element 390 is inactivated, the piezoelectric element 390 and the diaphragm 320 return to their original shapes. As a result, since the space 340 regains its original volume, the pressure of the spacer-dispersed solution in the space 340 increases, thereby causing a droplet 410 of the spacer-dispersed solution to be discharged from the nozzle hole 370 toward the substrate.

With the spacer-disposing method using such an inkjet-discharging method, scatter positions of the spacers 15 can be controlled. More specifically, the liquid crystal display device having a structure in which the spacers 15 are disposed only or mainly in the depressions 39 can be provided. Meanwhile, the signal electrodes 6 and the alignment film 7 are formed on the upper substrate 3. Then, by mutually bonding the substrate 3 and the substrate 2 having the above-mentioned spacers 15 disposed thereon, having a sealing member interposed therebetween, by injecting the liquid crystal 4 into the space formed between the substrates 2 and 3 from a liquid-crystal injection port formed in the sealing member after the sealing member is cured, and by sealing the injection port with a sealant, the liquid crystal panel 10 shown in FIGS. 1 and 2 is provided.

In the case of the liquid crystal display device 100 shown in FIGS. 3 and 4, TFT elements are formed on the lower substrate 102 serving as an element substrate and then the pixel electrodes 108 and the alignment film 109 are formed on this substrate. Meanwhile, the counter electrodes 106 are formed on the upper substrate 103 serving as a counter substrate, and in addition, by forming the light-shielding films 113 and the coloring layers 112 thicker than the light-shielding films 113, the depressions 139 are formed so as to correspond to the positions for forming light-shielding films 113. Subsequent to the formation of the alignment film 107, the spacers 115 are disposed in the depressions 139 by the above-mentioned inkjet-discharging method. After the substrates are bonded together in the same fashion as mentioned above, by injecting the liquid crystal into the space between the substrates and then by sealing the space, the liquid crystal panel 110 is provided. Also, in this case, when groove-shaped depressions are beforehand formed on the substrate 3 so as to correspond to the positions for forming light-shielding films 113, the depth of the depressions can be freely designed.

Figure 12A:
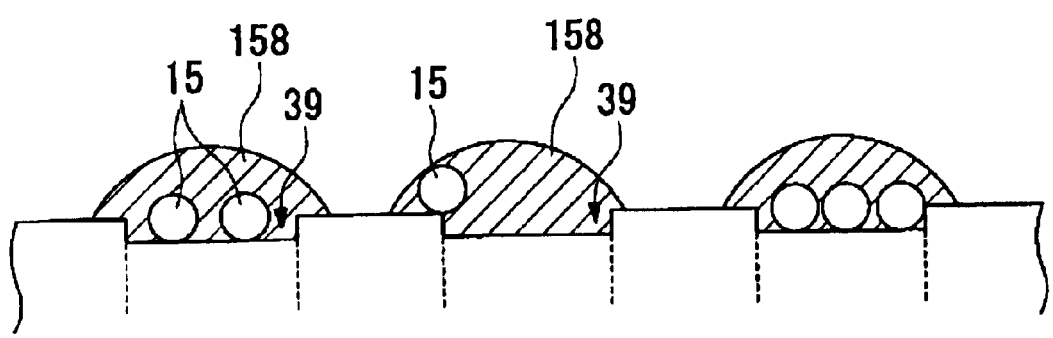
FIGS. 12a and 12b are schematics that illustrate the effect of the step of disposing the spacers in fabrication of the liquid crystal display apparatus according to Exemplary Embodiment 1.
Figure 12B:
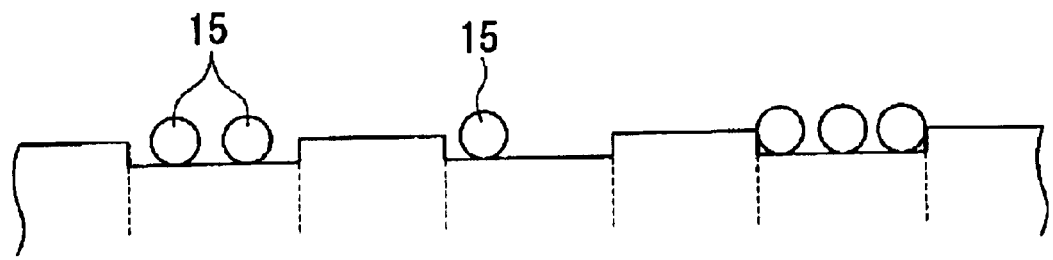

In the method for fabricating the liquid crystal display device, according to the present exemplary embodiment, with which the inkjet-discharging method is used in the step of disposing the spacers as described above, the spacers are disposed in the depressions 39, especially by dropping the spacer-dispersed solution in the depressions 39 and by evaporating the solvent. However, for example, when droplets of spacer-dispersed solution 158 are dropped from the inkjet nozzle 300 as shown in FIG. 12a, the droplets of the spacer-dispersed solution 158 flow over the depressions 39. Thus, some of the spacers 15 may also flow over the corresponding depressions 39, for example, as shown in FIG. 12a. Meanwhile, in the present exemplary embodiment, since the depressions 39 are formed, the spacers 15 are moved towards the centers of the corresponding depressions 39 due to the surface tension of the droplets of the solution 158 as the solvent evaporates. As a result, the spacers 15 flow over the depressions 39 during the dropping of the droplets are moved so as to be disposed in the depressions 39. Accordingly, by forming the depressions 39 and by using the inkjet-discharging method as in the fabrication method according to the present exemplary embodiment, the spacers 15 can be disposed only or mainly in the depressions 39.

[Exemplary Electronic Apparatus]

Specific examples of electronic apparatus, each including either of the liquid crystal display devices according to Exemplary Embodiment 1 and Exemplary Embodiment 2, are described below.

Figure 13A:
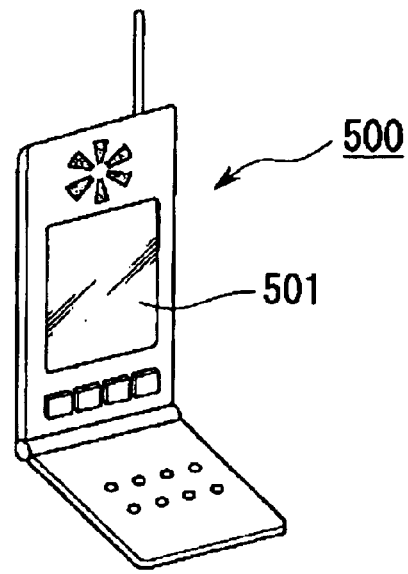
FIGS. 13a to 13c are perspective views illustrating some examples of electronic apparatus according the present invention.

FIG. 13a is a perspective view illustrating an example of a portable phone. In FIG. 13a, reference numerals 500 and 501 respectively denote a main body of the portable phone and a liquid crystal display unit including either of the liquid crystal display device according to Exemplary Embodiment 1 and Exemplary Embodiment 2.

Figure 13B:
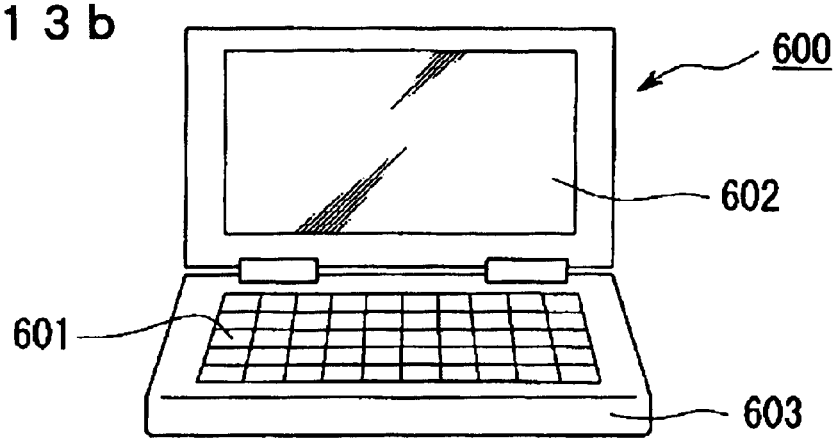

FIG. 13b is a perspective view illustrating an example of a portable information processing apparatus, such as a word processor or a personal computer, for example. In FIG. 13b, reference numerals 600, 601, 603, and 602 respectively denote an information processing apparatus, an input unit such as a keyboard, a main body of the information processing apparatus, and a liquid crystal display unit including either of the liquid crystal display devices according to Exemplary Embodiment 1 and Exemplary Embodiment 2.

Figure 13C:
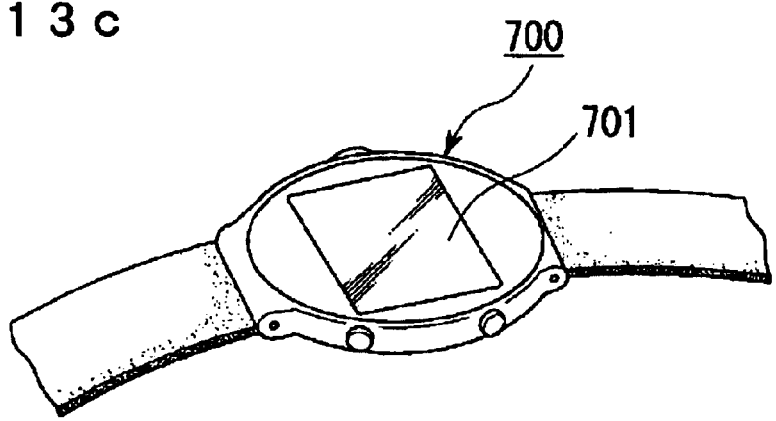

FIG. 13c is a perspective view of an example of a wristwatch-type electronic apparatus. In FIG. 13c, reference numerals 700 and 701 respectively denote a main body of a wristwatch and a liquid crystal display unit including either of the liquid crystal display devices according to Exemplary Embodiment 1 and Exemplary Embodiment 2.

Since each of the electronic apparatus shown in FIGS. 13a to 13c includes either of the liquid crystal display devices according to Exemplary Embodiment 1 and Exemplary Embodiment 2 as mentioned above, these electronic apparatus offer high-quality display.

[Exemplary Advantage of the Invention]

As described above, according to the present invention, since depressions are formed on at least one of a pair of substrates so as to dispose spacers mainly in the depressions, the gap between the substrates can be made more uniform, and with the relationship between the depth of the depressions and the diameter of the spacers, the gap between the substrates can be freely designed. Also, the spacers can be prevented or inhibited from flowing into other regions than the depressions. As a result, the spacers can be prevented or inhibited from becoming suspended in the liquid crystal layer.

What is claimed is:

1. A liquid crystal device, comprising:

a liquid crystal layer;

a pair of substrates sandwiching and holding the liquid crystal layer, the pair of substrates having pixel regions and non-pixel regions; and spacers disposed between the pair of substrates;

at least one of the pair of substrates having depressions formed at the non-pixel regions, and the spacers being only or mainly disposed in the depressions, a plurality of coloring layers being formed so as to correspond to the pixel regions; light-shielding films thinner than the coloring layers being formed between the adjacent coloring layers so as to correspond to the non-pixel regions; and the depressions being formed on the corresponding light-shielding films.

2. The liquid crystal device according to claim 1, a plurality of scanning electrodes being formed on one of the pair of substrates; a plurality of data electrodes being formed on the other substrate so as to intersect with the scanning electrodes; and the depressions being formed between the adjacent scanning electrodes and between the adjacent data electrodes.

3. A method for fabricating a liquid crystal device that includes spacers disposed between a pair of substrates sandwiching and holding a liquid crystal layer, the method comprising:

forming depressions on at least one of the substrates; and disposing the spacers in the depressions such that when a spacer-dispersed solution prepared by dispersing the spacers in a solvent is discharged in the depressions on the substrate with a droplet-discharging method, and when the solvent is evaporated, the spacers are disposed in the depressions.

4. The method for fabricating the liquid crystal device according to claim 3, forming of the depressions including, when electrodes having a predetermined pattern are formed on the substrate, forming the depressions between the adjacent electrodes.

5. The method for fabricating the liquid crystal device according to claim 3, the forming of the depressions including, when a plurality of light-shielding films are formed on the substrate and when coloring layers thicker than the light-shielding films are formed between the adjacent light shielding films, forming the depressions d on the light-shielding films.

6. The liquid crystal device according to claim 1, further comprising:

light-shielding layers formed at the non-pixel regions, the depressions being formed in correspondence with the light-shielding layers.

7. The liquid crystal device according to claim 6, further comprising:

a plurality of coloring layers formed at the pixel regions.

8. The liquid crystal device according to claim 1, further comprising:

a plurality of coloring layers formed at the pixel regions, the depressions formed at non-pixel regions between adjacent coloring layers.

9. The liquid crystal device according to claim 1, the at least one of the pair of substrates having pixel regions and non-pixel regions on the surface thereof, and the depressions being formed in the non-pixel regions.

* * * * *